United States Patent [19]
Bäcklund

[11] Patent Number: 6,100,576
[45] Date of Patent: Aug. 8, 2000

[54] SILICON SUBSTRATE HAVING A RECESS FOR RECEIVING AN ELEMENT

[75] Inventor: Ylva Bäcklund, Uppsala, Sweden

[73] Assignee: Telefonaktiebolaget LM Ericsson, Stockholm, Sweden

[21] Appl. No.: 08/957,983

[22] Filed: Oct. 27, 1997

Related U.S. Application Data

[63] Continuation of application No. PCT/SE96/00531, Apr. 23, 1996.

[30] Foreign Application Priority Data

Apr. 27, 1995 [SE] Sweden ................................. 9501591

[51] Int. Cl.⁷ ........................... H01L 29/06; H01L 29/00; H01L 33/00
[52] U.S. Cl. ........................ 257/622; 257/618; 257/522; 257/98; 257/99
[58] Field of Search ..................................... 257/622, 618, 257/522, 81, 98, 99, 433, 432, 664

[56] References Cited

U.S. PATENT DOCUMENTS

| | | | |
|---|---|---|---|
| 3,880,684 | 4/1975 | Abe ........................................ | 257/622 |
| 4,210,923 | 7/1980 | North et al. ............................... | 357/30 |
| 4,270,134 | 5/1981 | Takeda et al. ............................ | 357/19 |
| 4,945,400 | 7/1990 | Blonder et al. ........................... | 357/74 |
| 5,328,559 | 7/1994 | Jerman ..................................... | 257/622 |
| 5,412,748 | 5/1995 | Furuyama et al. ........................ | 257/98 |

FOREIGN PATENT DOCUMENTS 566 929  10/1993  European Pat. Off. .
59007913  1/1984  Japan .

OTHER PUBLICATIONS

Japanese Abstract No. 59–7913, Jan. 17, 1984.

*Primary Examiner*—David Hardy
*Assistant Examiner*—Jesse A. Fenty
*Attorney, Agent, or Firm*—Burns, Doane, Swecker & Mathis, L.L.P.

[57] ABSTRACT

In silicon substrate having a recess for receiving an element, at least one holding element, integral with the substrate, extends, at least partly, over the recess to hold an element received in the recess in place.

4 Claims, 1 Drawing Sheet

SILICON SUBSTRATE HAVING A RECESS FOR RECEIVING AN ELEMENT

This application is a continuation of International Application No. PCT/SE96/00531, filed Apr. 23, 1996, which designates the United States.

TECHNICAL FIELD

The invention relates to a silicon substrate having a recess for receiving an element as well as to a method of producing a recess in a silicon substrate for receiving an element, comprising masking areas on the substrate on either side of the intended recess, and thereafter etching out the recess.

BACKGROUND

It is generally known within the opto-electronic field to exactly align optical fibres with a high grade of accuracy by receiving the fibres in etched out grooves, so called V-grooves, in silicon substrates.

However, when mounting the optical fibres in such grooves, it can be difficult to make the optical fibres stay in place in the respective groove during all of the mounting operation.

When gluing the optical fibres to the grooves, it has, more-over, been observed that the optical fibres will rise some-what in the grooves due to the thickness of the glue layer, and, consequently, the position of the respective optical fibre in the vertical direction as well as the lateral direction on the substrate will be indefinite.

BRIEF DISCLOSURE OF THE INVENTION

The general object of the invention is to bring about a simple holding element for elements which are received in recesses in silicon substrates.

This is attained in the substrate according to the invention in that at least one holding element integral with the substrate, extends at least partially over the recess to hold an element received in the recess in place.

The method according to the invention of producing a recess in a silicon substrate is mainly characterized by masking also at least one area on the substrate, which, at least partly, extends across the intended recess to etch out a holding element corresponding to that area for holding an element received in the recess in place.

BRIEF DESCRIPTION OF THE DRAWING

The invention will be described more in detail below with reference to the appended drawing on which

DETAILED DESCRIPTION

Figure 1:
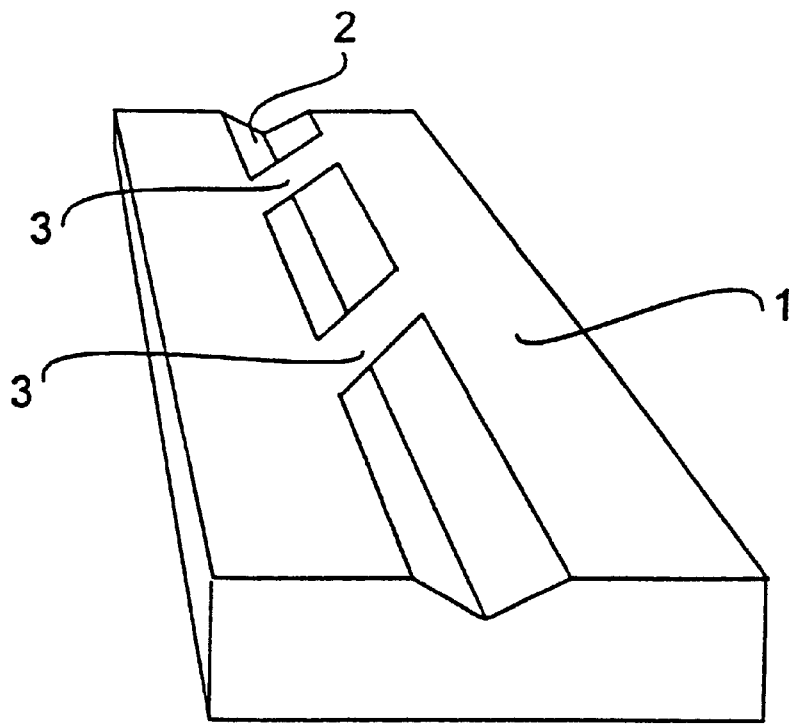
FIG. 1 is a perspective view of a silicon substrate having a recess in the form of a V-groove with a first embodiment of a holding element according to the invention.

FIG. 1 is a perspective view of a silicon substrate 1 having a recess in the form of a V-groove 2 for receiving an element (not shown), e.g. an optical fibre to be aligned relative to another element (not shown), two optical fibres to be spliced, a shaft to be rotated, a piston rod to be displaced back and forth in the groove etc. It is to be understood that a plurality of such grooves may be present on one and the same substate.

Such groove 2 is produced in that the silicon substrate 1, which is of a first doping type (n type or p type), is doped on either side of the intended groove 2 with a dopant of a second doping type (p type and n type, respectively), whereupon the intended groove 2 is etched in a manner known per se.

In this connection, it should be pointed out that the recesses do not necessarily have to be V-type grooves, but the recesses may be of any form in order to be able to receive e.g. electric components in the form of semiconductor chips.

In the embodiment of the invention shown in FIG. 1, two holding elements 3, which are formed integral with the substrate 1, extend obliquely across the groove 2, forming bridges, which are intended to keep e.g. an optical fibre (not shown) received in the groove 2 in place alternatively to keep one optical fibre each in place in connection with e.g. a fibre splicing operation.

The holding elements or bridges 3 shown in FIG. 1, are produced in accordance with a first embodiment of the method according to the invention in that areas on the substrate 1 corresponding to the bridges 3, are also doped with the above dopant of said second doping type, whereupon the bridges 3 are etched out in connection with the etching out of the groove 2.

The bridges 3 do not necessarily have to be of one and the same width but can actually be of any form.

It should be pointed out that bridges which extend perpendicularly across the groove can not be etched out on (100)-oriented silicon, but a certain, predetermined relationship has to exist between the form of the bridges and the angle of the bridges to the upper lateral edges of the groove on the substrate in order for the bridges to be formed upon etching.

The thickness of the bridges 3 is dependent on how deep the substrate 1 has been doped within the areas which are to form the bridges 3.

Figure 2:
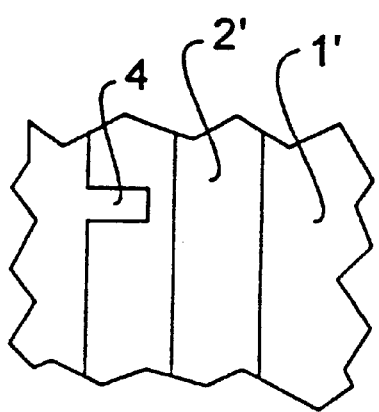
FIG. 2 is a schematical plan view of a section of a silicon substrate having a recess in the form of a V-groove with a second embodiment of a holding element according to the invention and FIG. 3 is a schematical plan view of a section of a silicon substrate having a recess in the form of a V-groove with a third embodiment of the holding element according to the invention.

FIG. 2 is a schematical plan view of a section of a substrate 1' having a groove 2' and a holding element 4 in the form of a tongue which extends from the left side of the groove 2' out over the groove 2' to a distance which in the embodiment shown corresponds to less than half the width of the groove 2'.

In this connection, it should be pointed out that holding elements which do not completely extend across the groove, very well can be perpendicular to the edge of the groove.

Figure 3:
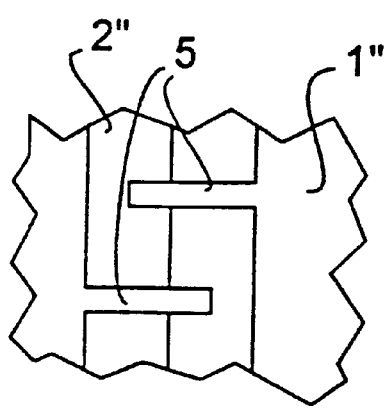

Also FIG. 3 is a schematical plan view of a section of a substrate 1" having a groove 2" and a couple of holding elements 5 in the form of tongues which from either side of the groove 2" extend perpendicularly over the groove to a distance which in the embodiment shown corresponds to a little more than half the width of the groove 2".

The tongues in FIGS. 2 and 3 may be produced with such a thickness that a certain flexibility is obtained so that they can be lifted upwards manually in order to be able to place an element of some kind to be held in the groove.

Thus, the holding elements according to the invention are formed integral with the substrate in the manner described above in connection with the etching of the grooves and/or recesses in the substrate, and can in a simple manner be produced with a desired thickness to keep optical fibres or other elements in place.

In the embodiment of the method according to the invention described above, it is possible to produce bridges of such a thickness and flexibility that they can be manually depressed to snap into contact with an element thereunder to further improve the holding action.

What is claimed is:

1. A silicon substrate having a recess for receiving an element, and at least one holding element, which is integral with the substrate and of less width than the length of the recess, in a direction parallel with a longitudinal axis of the recess, wherein the at least one holding element extends at least partly over the recess to hold an element received in the recess in place.

2. A silicon substrate having a recess for receiving an element, and at least one holding element, which is integral with the substrate and of less width than the length of the recess, wherein the at least one holding element is formed as a bridge which extends completely across the recess.

3. A silicon substrate having a recess for receiving an element, and at least one holding element, which is integral with the substrate and of less width than the length of the recess, wherein the at least one holding element is formed as a tongue which extends partly over the recess.

4. A substrate according to claim 1, wherein the at least one holding element extends obliquely over the recess.

* * * * *